(12) United States Patent
Torres

(10) Patent No.: US 10,101,576 B2
(45) Date of Patent: Oct. 16, 2018

(54) BORE SCOPE SYSTEM

(71) Applicant: David Torres, Grayslake, IL (US)

(72) Inventor: David Torres, Grayslake, IL (US)

(*) Notice: Subject to any disclaimer, the term of this patent is extended or adjusted under 35 U.S.C. 154(b) by 92 days.

(21) Appl. No.: 15/265,565

(22) Filed: Sep. 14, 2016

(65) Prior Publication Data
US 2018/0074309 A1    Mar. 15, 2018

(51) Int. Cl.
*H04N 7/18* (2006.01)
*G02B 23/24* (2006.01)
*H04N 5/225* (2006.01)

(52) U.S. Cl.
CPC ....... *G02B 23/2484* (2013.01); *H04N 5/2251* (2013.01); *H04N 7/185* (2013.01); *H04N 2005/2255* (2013.01)

(58) Field of Classification Search
None
See application file for complete search history.

(56) References Cited

U.S. PATENT DOCUMENTS

| | | |
|---|---|---|
| 5,363,838 A | 11/1994 | George |
| D358,471 S | 5/1995 | Cope et al. |
| 5,469,254 A | 11/1995 | Konomura |
| 6,211,904 B1 | 4/2001 | Adair et al. |
| 2010/0238278 A1 | 9/2010 | Rovegno |
| 2013/0102359 A1 | 4/2013 | Ho |
| 2014/0275763 A1 | 9/2014 | King et al. |
| 2015/0276106 A1* | 10/2015 | Lopez ............... E04D 13/0765 285/18 |
| 2016/0262775 A1* | 9/2016 | Honda ................. A61B 17/22 |
| 2016/0379504 A1* | 12/2016 | Bailey .................. G09B 5/02 434/219 |

* cited by examiner

*Primary Examiner* — Eileen M Adams

(57) ABSTRACT

A bore scope system includes an HVAC system has at least one duct and at least one vent. An electronic device is provided that has an input and a display. The electronic device is manipulated to observe the display. A camera unit is provided. The camera unit is comprised of a resiliently bendable material. Thus, the camera unit may be manipulated into a selected shape. The camera unit is inserted into the at least one vent and is urged into the at least one duct. Thus, such that the camera unit records an interior of the at least one duct for inspection purposes.

5 Claims, 4 Drawing Sheets

BORE SCOPE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including information disclosed under 37 CFR 1.97 and 1.98

The disclosure and prior art relates to scope devices and more particularly pertains to a new scope device for visually inspecting HVAC ducts.

BRIEF SUMMARY OF THE INVENTION

An embodiment of the disclosure meets the needs presented above by generally comprising an HVAC system has at least one duct and at least one vent. An electronic device is provided that has an input and a display. The electronic device is manipulated to observe the display. A camera unit is provided. The camera unit is comprised of a resiliently bendable material. Thus, the camera unit may be manipulated into a selected shape. The camera unit is inserted into the at least one vent and is urged into the at least one duct. Thus, the camera unit records an interior of the at least one duct for inspection purposes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
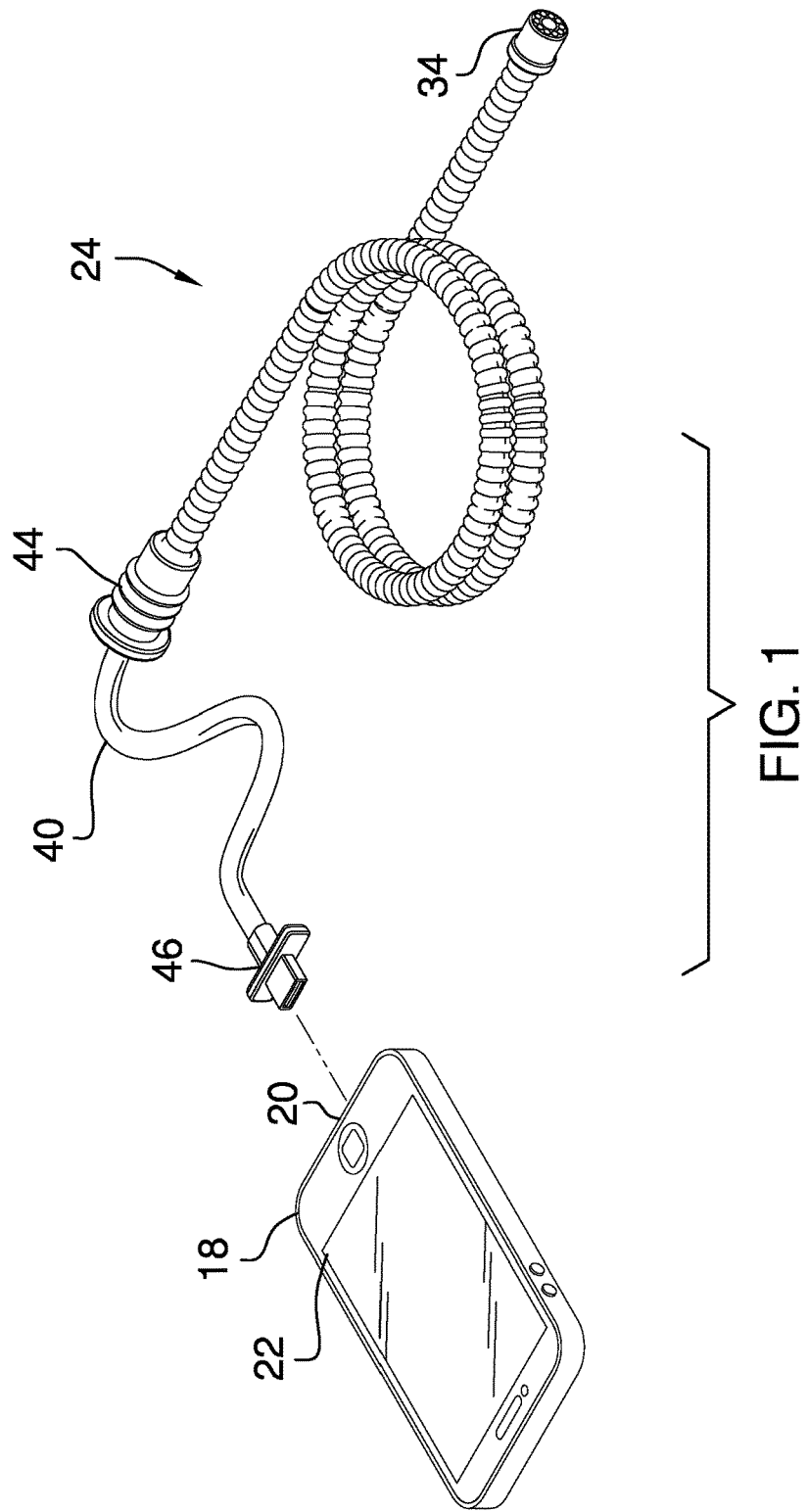
FIG. 1 is a perspective view of a bore scope system according to an embodiment of the disclosure.
Figure 2:
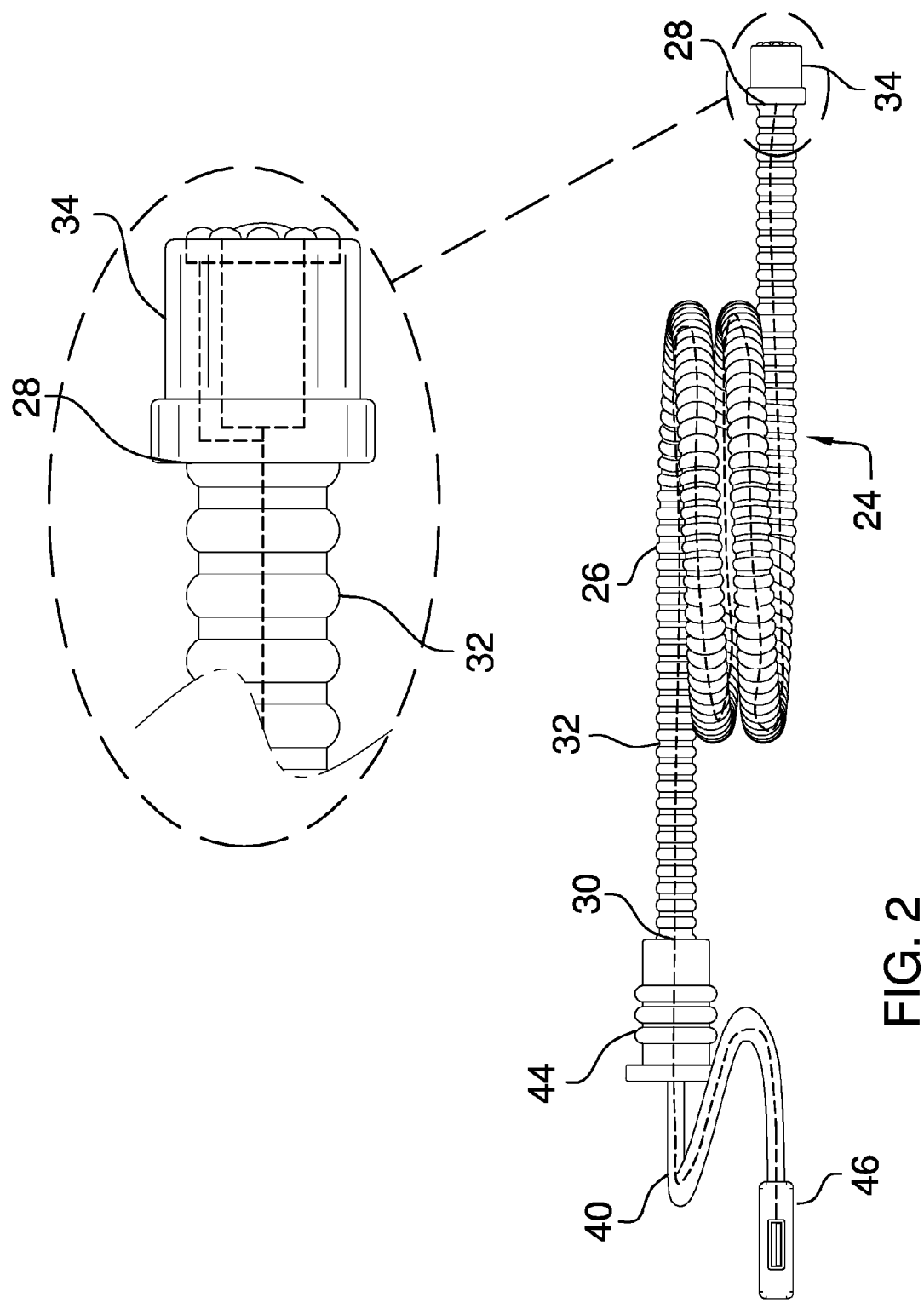
FIG. 2 is a side perspective view of a camera unit of an embodiment of the disclosure.
Figure 3:
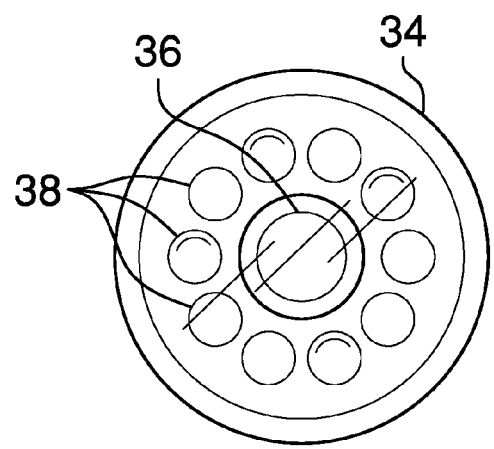
FIG. 3 is a front view of a camera of an embodiment of the disclosure.
Figure 5:
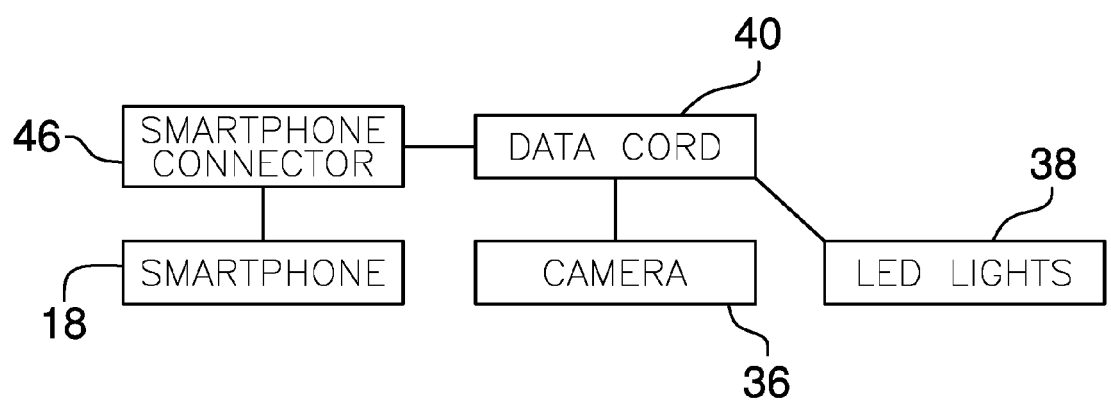
FIG. 5 is a schematic view of an embodiment of the disclosure.
Figure 4:
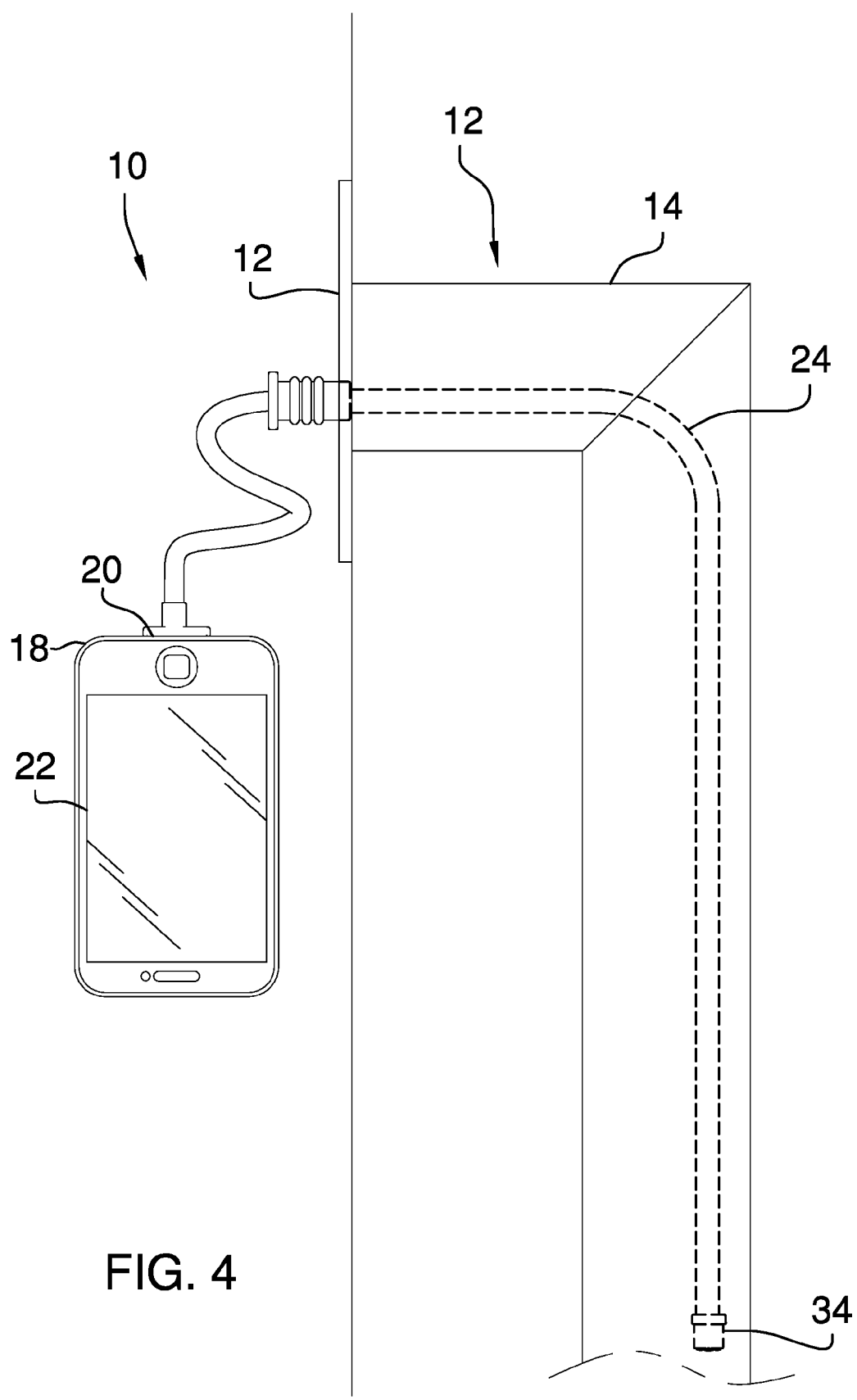
FIG. 4 is a perspective in-use view of an embodiment of the disclosure.

With reference now to the drawings, and in particular to FIGS. 1 through 5 thereof, a new scope device embodying the principles and concepts of an embodiment of the disclosure and generally designated by the reference numeral 10 will be described.

As best illustrated in FIGS. 1 through 5, the bore scope system 10 generally comprises an HVAC system 12 that has at least one duct 14 and at least one vent 16. The HVAC system 12 may be a heating and cooling system in a home or the like. An electronic device 18 is provided that has an input 20 and a display 22. The electronic device 18 may be manipulated thereby facilitating the display 22 to be observed. The electronic device 18 may be a smart phone or the like.

A camera unit 24 is provided. The camera unit 24 is comprised of a resiliently bendable material. Thus, the camera unit 24 may be manipulated into a selected shape. The camera unit 24 is inserted into the at least one vent 16 and is urged into the at least one duct 14. The camera unit 24 records an interior of the at least one duct 14. Thus, the interior of the at least one duct 14 is visually inspected. Moreover, the camera unit 24 facilitates any enclosed and dark space in the HVAC system 12 to be visually inspected.

The camera unit 24 comprises a sleeve 26 that has a first end 28, a second end 30 and an outer wall 32 extending therebetween. The outer wall 32 is comprised of a resiliently bendable material. The sleeve 26 may be a gooseneck camera 34 sleeve 26 or the like. A camera 34 is coupled to the first end 28 of the sleeve 26. The sleeve 26 may have a length ranging between twelve cm and ninety cm.

The camera 34 comprises a lens 36 that is positioned on the first end 28 of the sleeve 26. The lens 36 records images of an interior of the at least one duct 14. A plurality of light emitters 38 is provided and each of the light emitters 38 is coupled to the first end 28. The light emitters 38 may be spaced apart from each other and distributed around the lens 36. Each of the light emitters 38 emits light thereby illuminating the interior of the at least one duct 14. Each of the light emitters 38 may be an LED or the like. The lens 36 may be a digital camera lens or the like.

A data cord 40 is coupled to and extends away from the second end 30. The data cord 40 is electrically coupled to the camera 34. The data cord 40 has a distal end 42 with respect to the sleeve 26. A grip 44 may be coupled around the second end 30 of the sleeve 26. Thus, the grip 44 may enhance gripping the second end 30.

A plug 46 is electrically coupled to the second end 30 of the data cord 40. The plug 46 is in electrical communication with the camera 34. The plug 46 is selectively electrically coupled to the input 20 of the electronic device 18. Thus, the display 22 may the images thereby facilitating the interior of the at least one duct 14 to be inspected. The plug 46 may be a mini-usb plug, a fire wire plug or other data plug.

In use, the first end 28 of the sleeve 26 is inserted through the at least one vent 16. The sleeve 26 is urged into the at least one duct 14. The outer wall 32 of the sleeve 26 is manipulated into a selected shape. Thus, the sleeve 26 travels around a bend in the at least one duct 14.

The plug 46 is electrically coupled to the input 20 on the electronic device 18. Thus, the electronic device 18 controls operational parameters of the camera 34. The light emitters 38 illuminate the interior of the at least one duct 14. The lens 36 records images of the interior of the at least one duct 14 and the images are viewed on the display 22. Thus, the interior of the at least one duct 14 is visually inspected.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bore scope system comprising:
   an HVAC system having at least one duct and at least one vent;
   an electronic device having an input and a display, said electronic device being configured to be manipulated thereby facilitating said display to be observed; and
   a camera unit being comprised of a resiliently bendable material wherein said camera unit is configured to be manipulated into a selected shape, said camera unit being inserted into said at least one vent and being urged into said at least one duct such that said camera unit records an interior of said at least one duct wherein said at least one duct is configured to be inspected, wherein said camera unit comprises
      a sleeve having a first end, a second end and an outer wall extending therebetween, said outer wall being comprised of a resiliently bendable material, and
      a camera being coupled to said first end, said camera comprising a plurality of light emitters, each of said light emitters being coupled to said first end wherein each of said light emitters is configured to emit light thereby illuminating said interior of said duct.

2. The system according to claim 1, wherein said camera comprises a lens being positioned on said first end wherein said lens is configured to record images of an interior of said duct.

3. The system according to claim 1, further comprising a data cord being coupled to and extending away from said second end, said data cord being electrically coupled to said camera, said data cord having a distal end with respect to said sleeve.

4. A bore scope system comprising:
   an HVAC system having at least one duct and at least one vent;
   an electronic device having an input and a display, said electronic device being configured to be manipulated thereby facilitating said display to be observed; and
   a camera unit being comprised of a resiliently bendable material wherein said camera unit is configured to be manipulated into a selected shape, said camera unit being inserted into said at least one vent and being urged into said at least one duct such that said camera unit records an interior of said at least one duct wherein said at least one duct is configured to be inspected, wherein said camera unit comprises
      a sleeve having a first end, a second end and an outer wall extending therebetween, said outer wall being comprised of a resiliently bendable material, and
      a camera being coupled to said first end,
      a data cord being coupled to and extending away from said second end, said data cord being electrically coupled to said camera, said data cord having a distal end with respect to said sleeve, and
      a plug being electrically coupled to said second end of said data cord such that said plug is in electrical communication with said camera, said plug being selectively electrically coupled to said input of said electronic device wherein said display is configured to display the images thereby facilitating said duct to be inspected.

5. A bore scope system comprising:
   an HVAC system having at least one duct and at least one vent;
   an electronic device having an input and a display, said electronic device being configured to be manipulated thereby facilitating said display to be observed; and
   a camera unit being comprised of a resiliently bendable material wherein said camera unit is configured to be manipulated into a selected shape, said camera unit being inserted into said at least one vent and being urged into said at least one duct such that said camera unit records an interior of said at least one duct wherein said at least one duct is configured to be inspected, said camera unit comprising:
      a sleeve having a first end, a second end and an outer wall extending therebetween, said outer wall being comprised of a resiliently bendable material,
      a camera being coupled to said first end, said camera comprising:
         a lens being positioned on said first end wherein said lens is configured to record images of an interior of said duct, and
         a plurality of light emitters, each of said light emitters being coupled to said first end wherein each of said light emitters is configured to emit light thereby illuminating said interior of said duct;
      a data cord being coupled to and extending away from said second end, said data cord being electrically coupled to said camera, said data cord having a distal end with respect to said sleeve, and
      a plug being electrically coupled to said second end of said data cord such that said plug is in electrical communication with said camera, said plug being selectively electrically coupled to said input of said electronic device wherein said display is configured to display the images thereby facilitating said duct to be inspected.

\* \* \* \* \*